Figure 2:
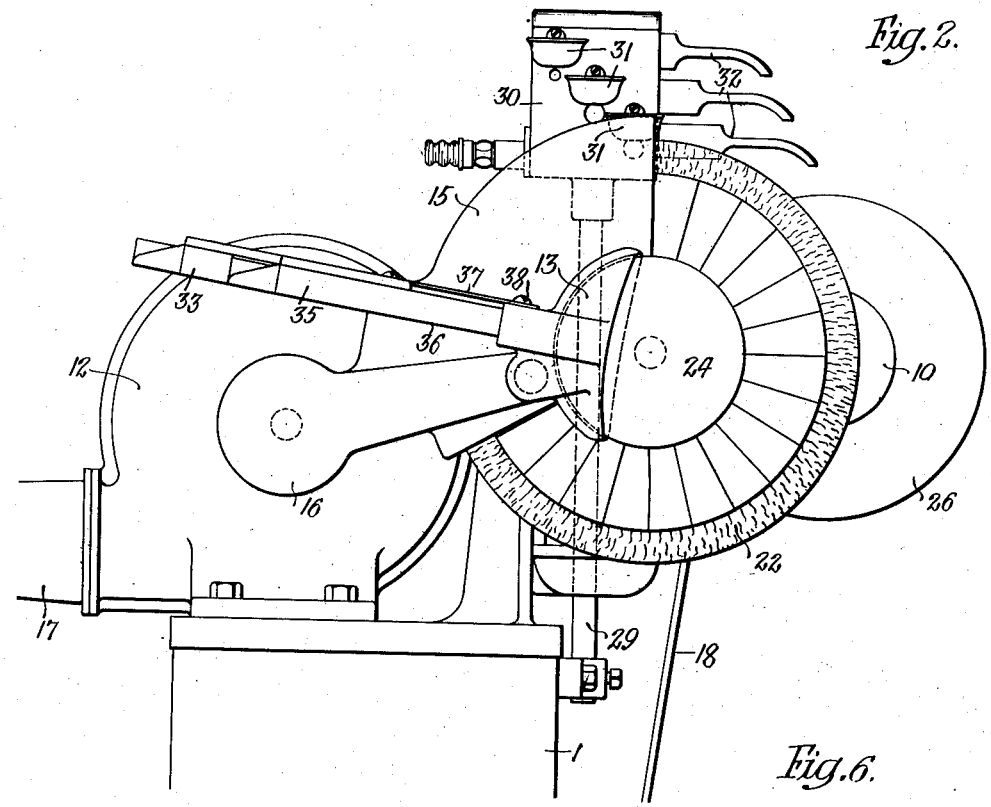

W. B. KEIGHLEY.
UNIVERSAL SHOE FINISHING MACHINE.
APPLICATION FILED MAY 2, 1911.
1,058,596.
Patented Apr. 8, 1913.
5 SHEETS—SHEET 1.
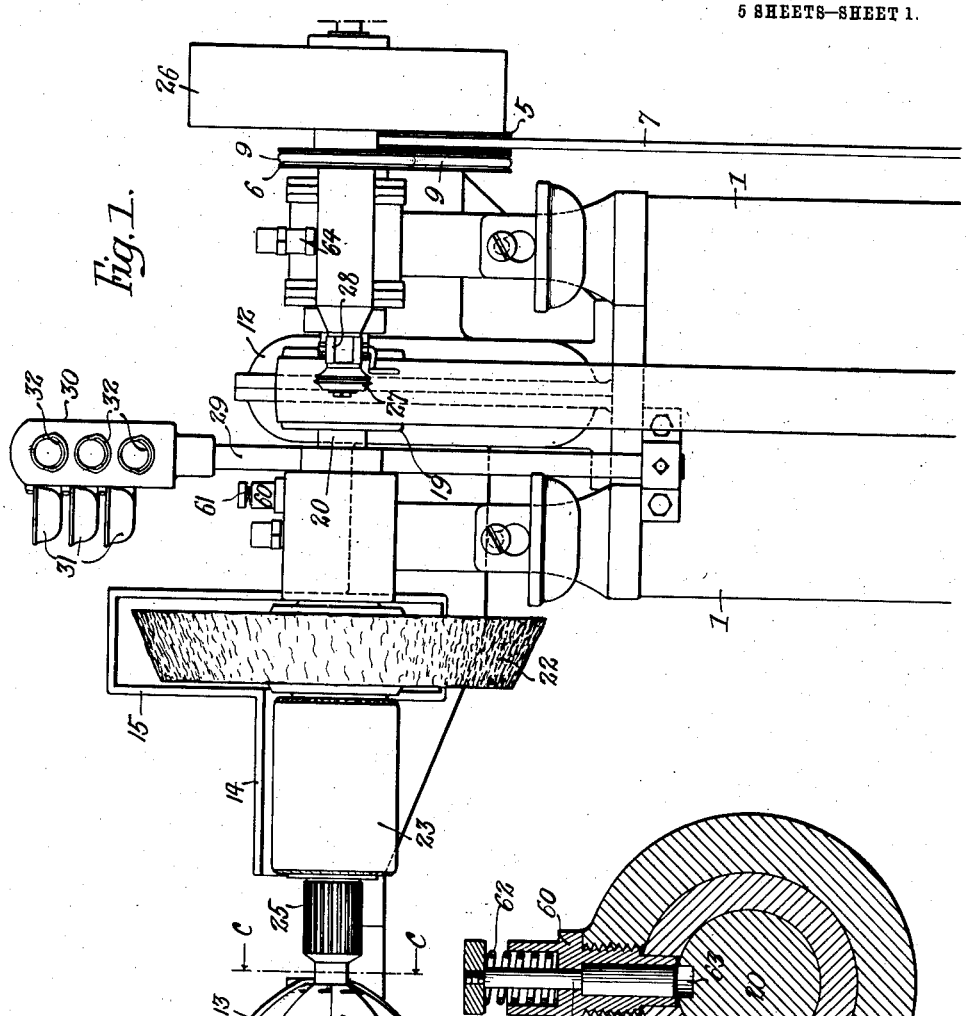
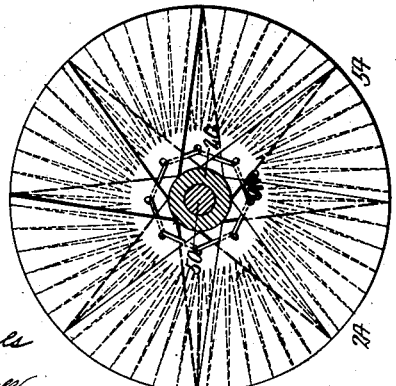

W. B. KEIGHLEY.
UNIVERSAL SHOE FINISHING MACHINE.
APPLICATION FILED MAY 2, 1911.

1,058,596.

Patented Apr. 8, 1913.

5 SHEETS—SHEET 2.

Witnesses:—

Inventor:—
William B. Keighley.
by his Attorneys,—
Howson & Howson

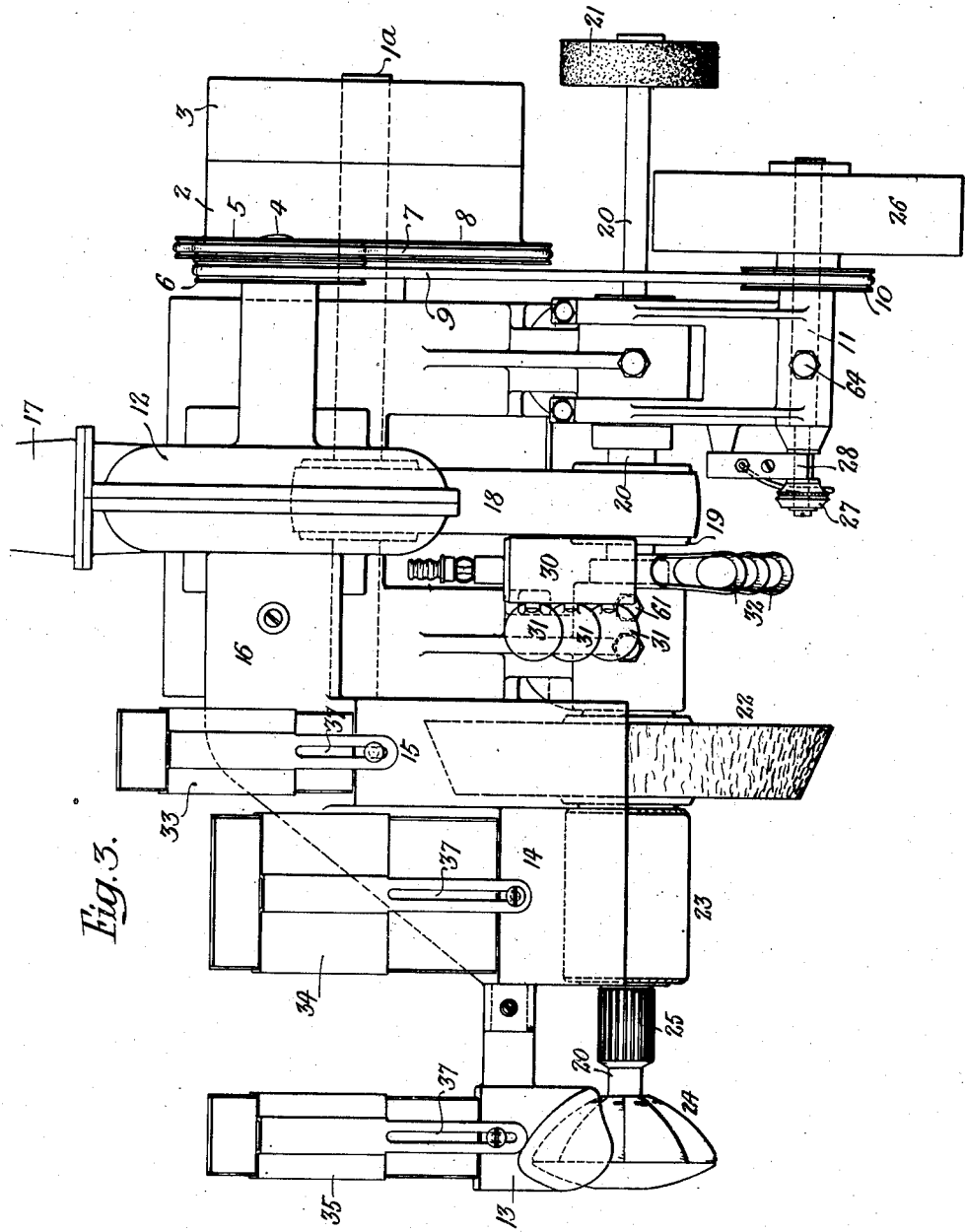

W. B. KEIGHLEY.
UNIVERSAL SHOE FINISHING MACHINE.
APPLICATION FILED MAY 2, 1911.
1,058,596.
Patented Apr. 8, 1913.
5 SHEETS—SHEET 4.
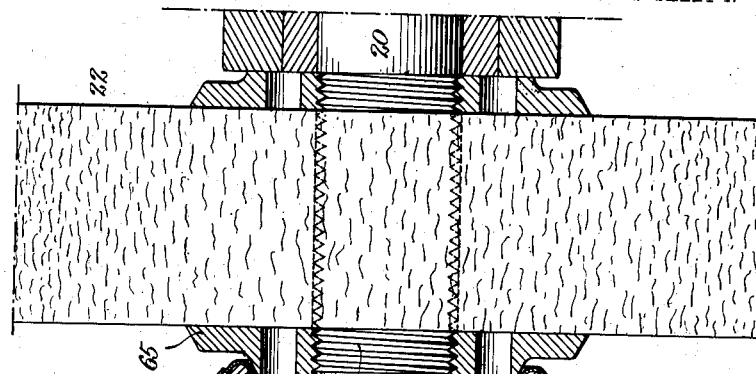
Fig. 4.
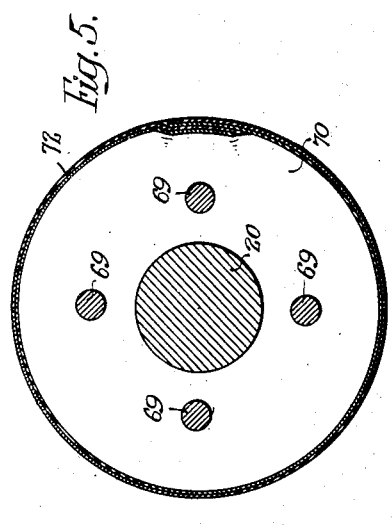
Fig. 5.
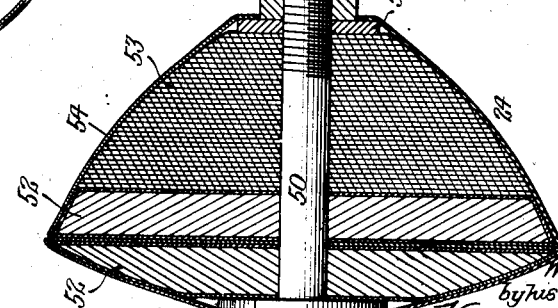
Inventor—
William B. Keighley.
by his Attorneys—
Howson & Howson W. B. KEIGHLEY.
UNIVERSAL SHOE FINISHING MACHINE.
APPLICATION FILED MAY 2, 1911.
1,058,596.
Patented Apr. 8, 1913.
5 SHEETS—SHEET 5.
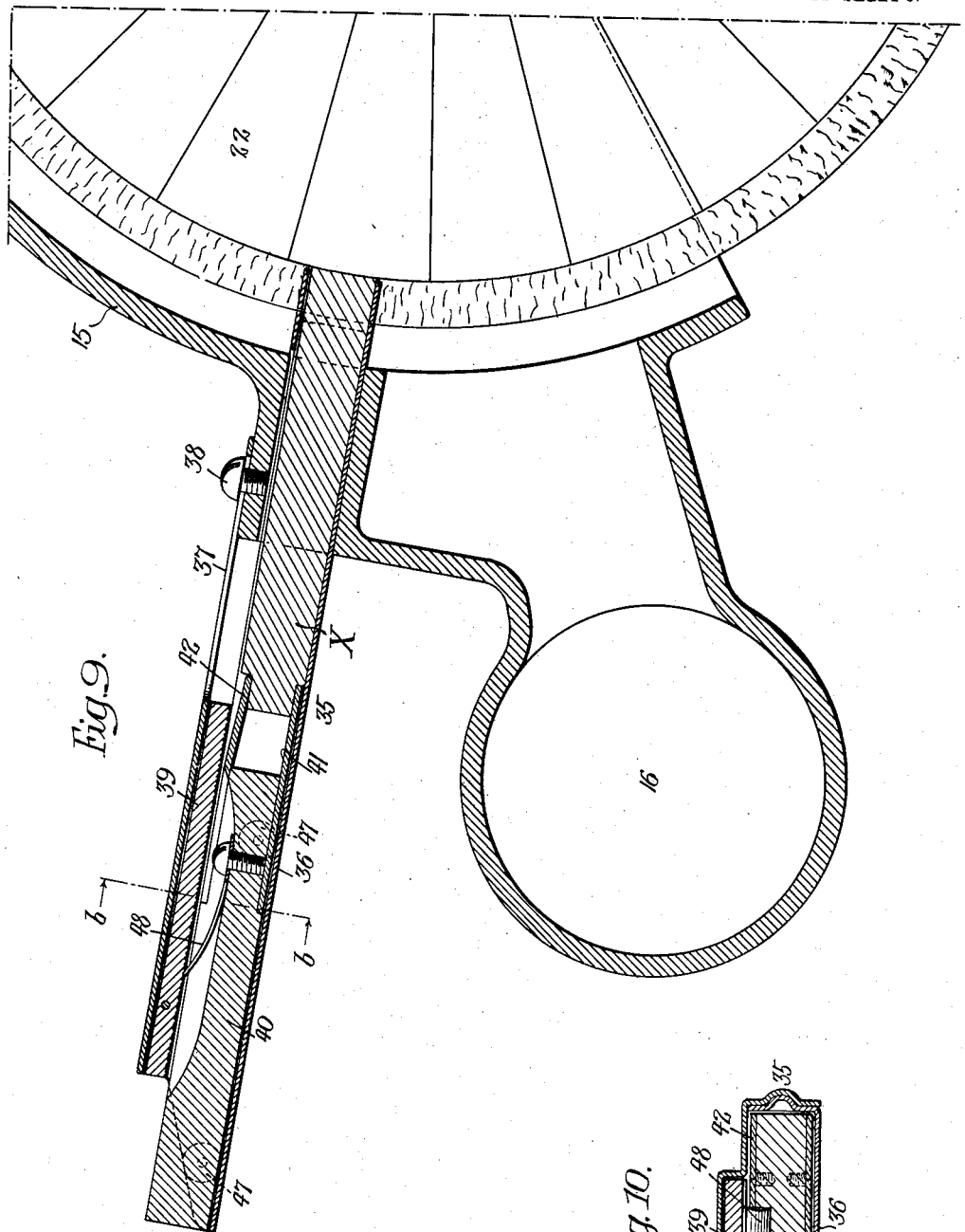
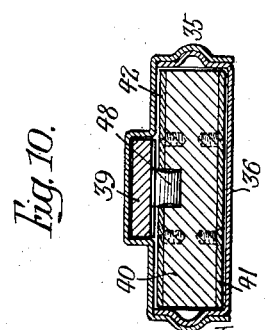

UNITED STATES PATENT OFFICE.

WILLIAM BOTTOMLEY KEIGHLEY, OF VINELAND, NEW JERSEY.

UNIVERSAL SHOE-FINISHING MACHINE.

1,058,596.  Specification of Letters Patent.  Patented Apr. 8, 1913.

Application filed May 2, 1911. Serial No. 624,632.

*To all whom it may concern:*

Be it known that I, WILLIAM B. KEIGHLEY, a citizen of the United States, and a resident of Vineland, Cumberland county, New Jersey, have invented certain Improvements in Universal Shoe-Finishing Machines, of which the following is a specification.

One object of my invention is to provide a machine having a number of parts coöperating with each other to a greater or less degree and especially designed for use in performing the operations necessary in the finishing of a shoe; it being particularly desired that the machine shall include a number of tools so assembled as to permit a single operator to perform on said machine all of a number of operations.

It is further desired to provide a shoe finishing machine which shall include a number of tools so mounted as to be used with the utmost convenience on a shoe; the arrangement being such as to permit the finishing operations to be performed in a minimum of time and with the expenditure of a minimum of labor.

Another object of my invention is to provide a shoe finishing machine which shall include relatively simple and substantial structures for mounting the various tools which it is desired to use and shall also possess novel means for carrying out certain of the operations necessary in shoe finishing.

I also desire to provide a shoe finishing machine with novel and relatively durable as well as inexpensive forms of brushes, finishing rolls, and covers for same; the invention further contemplating the provision of novel means for feeding wax to certain of the brushes or rolls, as well as means for holding the brush supporting shaft during such time as the various brushes, rolls, etc., are being placed in position thereon.

Another object of my invention is to provide a shoe finishing machine which, in addition to embodying a relatively large number of coöperating members for use in finishing a shoe, shall include novel means for rendering it possible to utilize certain of said members in more than one way.

These objects and other advantageous ends I secure as hereinafter set forth, reference being had to the accompanying drawings, in which:—

Figure 6:
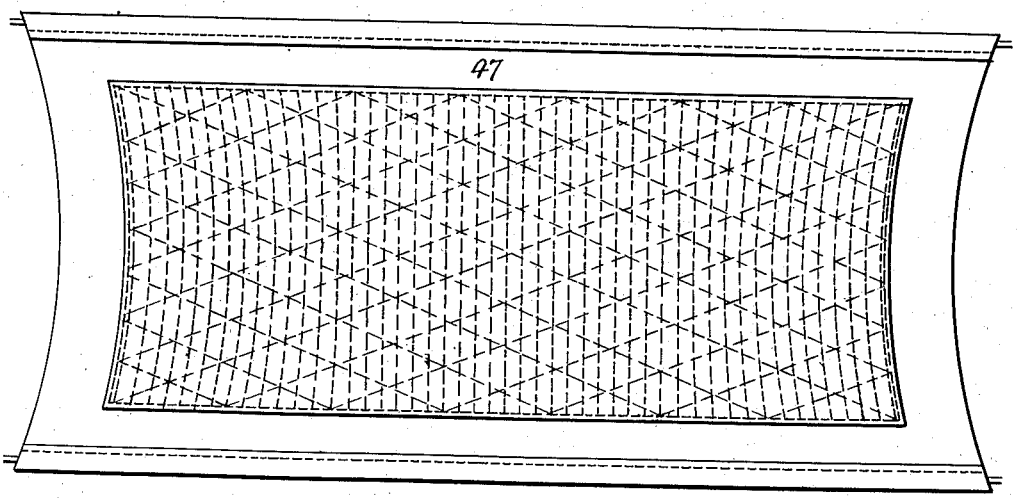

Figure 1, is a front elevation of the upper portion of a machine constructed according to my invention; Figs. 2 and 3 are respectively an end elevation and a plan of the machine shown in Fig. 1; Fig. 4, is an enlarged vertical section of certain of the brushes and rolls forming part of the machine; Fig. 5, is a vertical section taken on the line $a$—$a$, Fig. 4; Fig. 6, is a plan of the cover for one of the polishing brushes; Fig. 7, is a sectional view on the line $c$—$c$, Fig. 1, showing one of the brushes with its cover; Fig. 8, is an enlarged vertical section illustrating the detail construction of the device for temporarily holding the brush shaft from revolution; Fig. 9, is a full sized sectional elevation of one of the wax feeding devices with its associated parts, and Fig. 10, is a transverse section on the line $b$—$b$, Fig. 9.

In the above drawings 1 represents the main supporting structure or frame of my machine, which is usually made in the form of a casting having bearings mounted in its lower portion for the support of a driving shaft. This latter, indicated in dotted lines at 1ª in Fig. 3, has mounted on it fast and loose pulleys 2 and 3; there being on the upper portion of the frame of the machine, bearings for a shaft 4, to which is fixed a pair of pulleys 5 and 6. The first of these is connected by a belt 7 with a pulley wheel 8 on the main driving shaft, while the pulley 6 is connected by a belt 9 to a pulley 10 fixed to a shaft 11 mounted in a bearing supported at the extreme front of the machine. The shaft 4 is designed to drive a fan mounted in a casing 12 for the purpose of exhausting the air from three hoods 13, 14 and 15 connected through a conduit 16 with the intake of said fan; the arrangement being such that the air exhausted from said hoods is discharged through a suitable outlet conduit 17.

The main shaft at the lower part of the machine is connected through a belt 18 with a pulley 19 fixed to a brush shaft 20 carried in suitable bearings supported toward the front of the upper portion of the machine frame, and on this shaft are mounted a series of brushes or rolls 21, 22, 23, and 24, with a fluted roll 25; it being noted that the brushes 22, 23, and 24, are placed so as to extend under and within the exhaust hoods 15, 14, and 13 respectively.

The shaft 11 has fixed to it a yarn brush 26 and an indenting or edge setting tool 27; the latter being preferably heated by any suitable means as for example, by a friction device 28 bearing upon it adjacent said tool and of the construction well known in this art.

On the front portion of the frame of the machine, preferably between the pulley 19 and the brush 22, I mount a standard 29 carrying at its top a hot box 30 heated by gas, steam, or electricity, having receptacles 32 for tools which may be used in finishing shoes and also carrying a number of cups 31 for holding wax, coloring material or the like. The arrangement of parts is such that the tools may be kept heated and the wax melted ready for use. I also provide devices 33, 34 and 35 for supplying each of the brushes or rolls 22, 23 and 24 with wax. The detail construction of one of these wax supplying devices is well shown in Figs 9 and 10 from which it will be seen that the hood 15 for the brush to which the particular wax feeder illustrated is attached, has a substantially rectangular opening at its back portion to which is fitted a tube or guideway 36, preferably made of sheet metal and extending rearwardly. This is mounted so as to be adjustable toward and from the hood 15, for which purpose there is extended from its top portion a longitudinally slotted arm 37 for the reception of a set screw 38 mounted on the hood structure, and for automatically feeding the wax toward the brush within the hood, I mount inside of the guide 36 a plate 39 having a series of ratchet teeth on one of its faces.

Operative in the guideway is a wax holder consisting of a carriage in the form of a weight 40 having a pair of jaws 41 and 42 for gripping a stick or bar X of wax and provided with supporting wheels 47 so that it is free to easily run within the guideway. The upper portion of the weight is recessed and has mounted within it a spring pawl 48 placed to coöperate with the teeth of the ratchet plate or bar 39; the arrangement of parts being such that the guideway 36 is inclined downwardly toward the brush to which it is desired to supply wax. With such an arrangement the vibration of the machine under operating conditions facilitates the movement of the weight 40 with its stick of wax X toward the brush, and the pawl 48 with the ratchet 39 prevents any possible rearward movement of the carriage with the wax, and also the too rapid approach of the wax to the brush, by reason of the friction of the pawl on the ratchet teeth.

Referring more in detail to the various brushes or rolls, it is to be observed that the brush 21 is preferably made of relatively stiff bristles while the brush 26 is of yarn particularly designed for the final polishing. The brush 22 is usually made of seersucker, hair, or yarn such as is commonly used in shoe finishing, being built up in sections in the well known manner and made with a cylindrical or conical face as may be considered desirable. The various sections of this brush are held in place by a clamping plate 65 mounted on a threaded portion 66 on the shaft 20. This plate has the necessary openings for the reception of a spanner wrench and its outer face is provided with a raised boss or annular projection. The roll 23 is mounted on the shaft between the fluted metallic roll 25 and the brush 22 and consists of two circular plates 67 and 68 rigidly connected by four bolts 69 extending loosely through a series of circular sheets or disks 70 of rubberized fabric such as cotton, silk, or linen; there being at each end of the cylindrical mass formed by these disks two relatively thick disks 71 of sponge rubber. Over the roll is mounted a cover 72 of strong fabric such as canvas whose ends are clamped, in the one case between the raised boss of the clamping plate 65 and the end plate 67, and in the other case between the end plate 68 and a flange 73 formed integral with the fluted roll 25. On this fabric cover are stitched one or any number of layers or pieces of rubberized fabric, and the stitching is both diagonal and transverse so that the cover is in effect quilted, thereby effectually preventing serious cutting or tearing in the event of a projecting nail or the like catching in said cover. As shown in Fig. 6, the ends of the cover are cut in curves which are preferably circular arcs so that when it is tightened or drawn into place, there are no loose or projecting ends. In mounting said cover on the roll, one end, after being given its proper position, is clamped between the plates 65 and 67, and the other, after being pulled into the desired place, is finally clamped between the plate 68 and the flange 73, by adjusting the roll 25, of which said flange forms a part, upon the threaded part 49 of the shaft 20. This fluted roll 25 is designed as a nail or slug cleaner and its flutings or corrugations are relatively blunt edged so as to effectually remove the ink from the heads and edges of the nails in the heel of a shoe without tending to cut any of the parts.

The end of the shaft 20 is recessed and threaded for the reception of a headed bolt 50 and there is on said bolt a plate or washer 51 in engagement with said shaft end. Between this washer and the bolt head are confined flattened conical disks 52 of sponge rubber together with a more or less conical mass 53 of rubberized fabric disks; it being noted that the sponge rubber pieces and the mass 53 are arranged with their bases toward each other so as to provide a relatively sharp edge. The disks making up the body 53 and the sponge rubber pieces are loose on the shaft 50, but are all carefully connected together into one flexible whole, which in turn is provided with a rubberized cloth cover 54 of the general form shown in Fig. 7, from which it will be seen that said cover consists of a bag shaped fabric structure composed of a circular piece to whose peripheral portions are attached a suitable number of overlapping segmental pieces or swatches having a drawing string extended through their pointed ends. These pieces as well as the circular piece are quilted or sewed as shown.

For convenience in mounting the various brushes or rolls and their associated parts on the shaft 20, the threaded portion 41 thereof is made with a left hand thread as is also the part 49 and the bolt 50, with the result that the various parts of the device tend rather to tighten than to loosen under operating conditions.

It may be noted that the cover 54 of the conical roll 24 is preferably made of the rubberized fabric above referred to, although it is to be understood that other materials such as drilling, rubber, felt, leather, etc., may be used if desired.

Under conditions of use, the various parts of the shoe to be finished are successively presented by a single operator to the various brushes or rolls and other tools forming part of my improved machine; it being noted that the life of the covers used on the brushes 23 and 24 is greatly prolonged by reason of the particular construction employed, since not only is their tearing and rapid destruction prevented by reason of the quilting, but it is obvious that the provision of a number of layers will greatly increase the time of usefulness of the device, since these may be permitted to successively wear through before it is necessary to remove or replace a cover.

As is obvious, the operation of mounting the various brushes, rolls, etc., upon the shaft 20 renders it advisable to provide some means for temporarily preventing turning of the latter and for this purpose I mount in one of the shaft bearings a cylindrical guide 60 having a headed plunger 61 normally maintained in an outer position away from the shaft 20 by a spring 62. This guide piece is screwed into the bearing so as to project in a line at right angles to the shaft and the latter is formed with a recess 63 formed to receive the end of the plunger 61. Under conditions of use said plunger may be forced inwardly by pressure exerted on its head as the shaft 20 is turned by hand, until it enters the recess 63. Thereafter by the exertion of greater or less turning force on the shaft, the plunger is retained in its inner position against the action of the spring 62, thus effectually holding said shaft from turning and permitting the various parts to be screwed firmly into place. As soon, however, as the turning force ceases, said plunger immediately resumes its outer position, leaving the shaft free to revolve in the bearings. A similar device for temporarily holding the shaft 11 may be provided as indicated at 64.

When the various parts of the machine are driven at a suitable speed from the main shaft, the following shoe finishing operations may be performed on the machine heretofore described; viz., the top piece is padded on the roll 23 and the top piece slugs and nails are cleaned on the corrugated roll 25. Thereafter the shank and heel breast are padded on roll 24 and the shank and fore part edges are padded on the rolls 24 and 23 respectively. Then the forepart bottom is padded on the roll 23 and the heel is burnished on roll 24; all of the various parts being polished on the brush 22. The heel seat is padded on the edge setting tool 27 and under operating conditions the holes in the heel are plugged or filled with hot wax melted in the hot box 30—31. Any fancy wheeling is done with tools preheated in the hot box 30 and after the stitch edges have been cleaned on brush 21, the final polishing is done on the yarn brush 26. Any dust or lint produced by the foregoing operation is carried away through the various hoods to the exhauster and is discharged through the outlet 17.

With the various parts arranged as shown, the amount of work performed by a single operator under ordinary conditions is very materially increased owing to the convenience and rapidity with which he is enabled to carry out the various finishing operations. Moreover, the construction and arrangement of the various brushes, rolls, etc., 22, 23, 24, and 25 is extremely simple and yet at the same time of such a nature as to give highly efficient results at a low cost of maintenance. Moreover, these parts are so arranged as to facilitate their convenient mounting and adjustment.

It will be noted that throughout the specification I have referred to certain of the members for operating on shoes as brushes or rolls, as, from a practical standpoint, these terms may be used interchangeably. It is, therefore, obvious that the substitution of a bristle bearing structure for one made of cloth or felt pieces or for the members made of rubberized fabric or vice versa, may be resorted to without departing from my invention.

I claim:—

1. The combination in a shoe finishing machine of a supporting structure; a shaft mounted thereon; two polishing members mounted on the shaft; a cover for one of said polishing members; and means for holding said member in position to cause its cover to be clamped in place by a portion of the other member.

2. The combination in a shoe finishing machine of a supporting structure; a shaft mounted thereon; two shoe engaging members mounted on the shaft, one of said members including a clamping plate; a cover for the second member; and means for forcing said second member toward the first member to clamp one end of its cover against said plate.

3. The combination in a shoe finishing machine of a supporting structure; a shaft mounted thereon; means for driving the shaft; a brush including a clamping plate mounted on said shaft; a roll including a frame; a cover for said roll; and a structure mounted on the shaft in position to clamp one end of the covering between itself and the framework and the opposite end of said cover between the frame and said clamping plate.

4. The combination in a shoe finishing machine of a supporting structure; a shaft mounted thereon; an abutment on said shaft; a roll consisting of a frame loosely mounted on the shaft and a series of polishing disks on said frame concentric with the shaft; with a second roll adjustably mounted on the shaft in position to confine the parts of the first roll between said abutment and itself.

5. The combination in a shoe finishing machine of a supporting structure; a shaft thereon; a polishing wheel including a clamping plate on the shaft; a roll also on the shaft; a second roll mounted between the first roll and the clamping plate; with a cover for said second roll having its ends clamped between the second roll and the clamping plate and first roll respectively.

6. The combination in a finishing machine of a supporting structure; a shaft mounted thereon; a member screwed on said shaft for operating on a shoe; and a device for temporarily preventing revolution of the shaft while said member is being mounted thereon, the same consisting of a plunger movable toward and from the shaft and fitting a recess therein; with means for normally holding said plunger away from the shaft.

7. The combination in a finishing machine of a supporting structure; a shaft mounted thereon; a member for operating on a shoe, removably mounted on the shaft; and means for temporarily holding the shaft while the said member is being mounted on or removed from the same, said means consisting of a plunger mounted in the supporting structure and movable into and out of a recess in the shaft; with a spring for normally maintaining said plunger in its outer position.

In testimony whereof, I have signed my name to this specification, in the presence of two subscribing witnesses.

WILLIAM BOTTOMLEY KEIGHLEY.

Witnesses:
WILLIAM E. HUGHES,
HARRY C. DOWN.